United States Patent [19]

Burgio, Jr.

[11] Patent Number: 4,983,852

[45] Date of Patent: Jan. 8, 1991

[54] SYSTEM AND METHOD FOR PHOTOCHEMICALLY CURING A COATING ON A SUBSTRATE

[76] Inventor: Joseph T. Burgio, Jr., 705 Jennings St., Bethlehem, Pa. 18017

[21] Appl. No.: 431,122

[22] Filed: Nov. 7, 1989

Related U.S. Application Data

[63] Continuation-in-part of Ser. No. 272,763, Nov. 17, 1988.

[51] Int. Cl.[5] .............. G01K 13/02

[52] U.S. Cl. .............. 250/504 R

[58] Field of Search .............. 250/494, 504 R, 503, 250/492.1

[56] References Cited

U.S. PATENT DOCUMENTS

| | | | |
|---|---|---|---|
| 3,026,435 | 3/1962 | McPherson | 250/504 R |
| 3,887,813 | 6/1975 | Allington | 250/504 R |
| 4,019,062 | 4/1977 | Rongren | 250/504 R |
| 4,048,916 | 9/1977 | Silverman et al. | 250/504 R |
| 4,798,960 | 1/1989 | Keller et al. | 250/504 R |

*Primary Examiner*—Bruce C. Anderson

*Attorney, Agent, or Firm*—Joseph J. O'Keefe

[57] ABSTRACT

A system for improved cooling of a photosensitive coating on a moving substrate comprising a reflector block and ultraviolet lamp assembly, a refrigerating device, water circulation system and control system. The reflector-block includes two longitudinally extending cooling conduits and is substantially completely cooled by refrigerated water circulated through such conduits within a temperature range monitored and regulated by the control system.

The method of this invention comprises controlling the temperature of the reflector-block of the apparatus for curing of a photosensitive coating on a moving substrate. The reflector-block is operated at a temperature range between about 50° F. to 90 ° F. by water circulated through the reflector-block conduits, which water is cooled by a refrigerating device to a temperature within a range between about 45° F. to 75° F. The temperature of the cooled water is monitored and controlled in a manner to start the refrigerating device when signals from a temperature monitoring device indicate the cooled liquid has deviated from an established temperature range.

16 Claims, 5 Drawing Sheets

FIG. 1
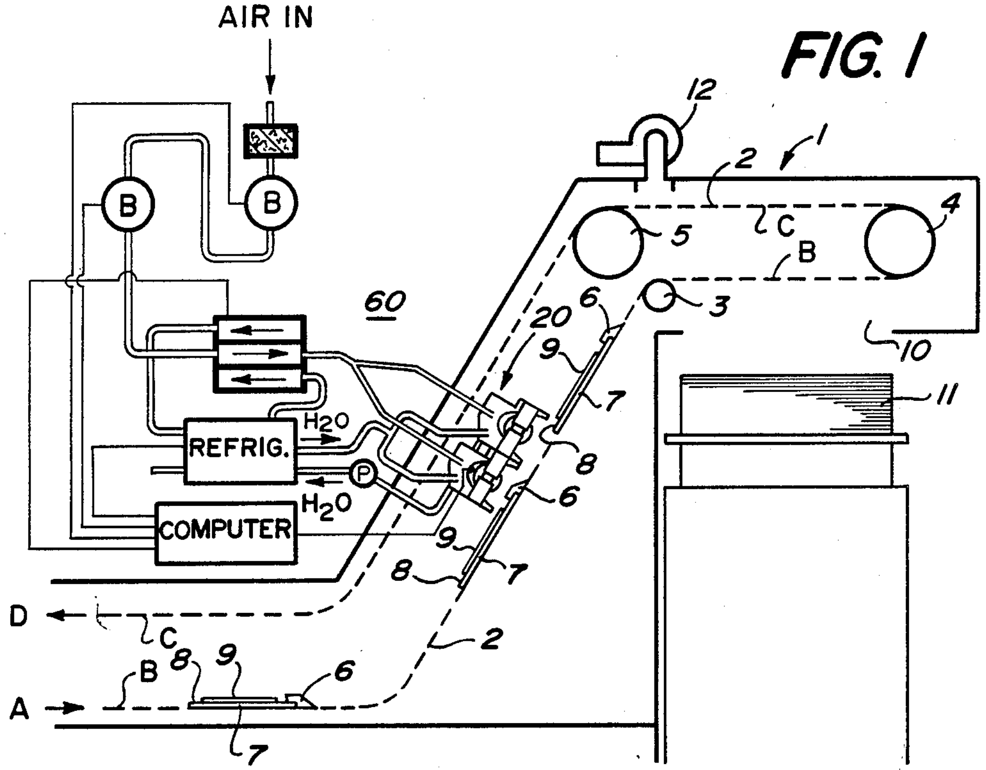
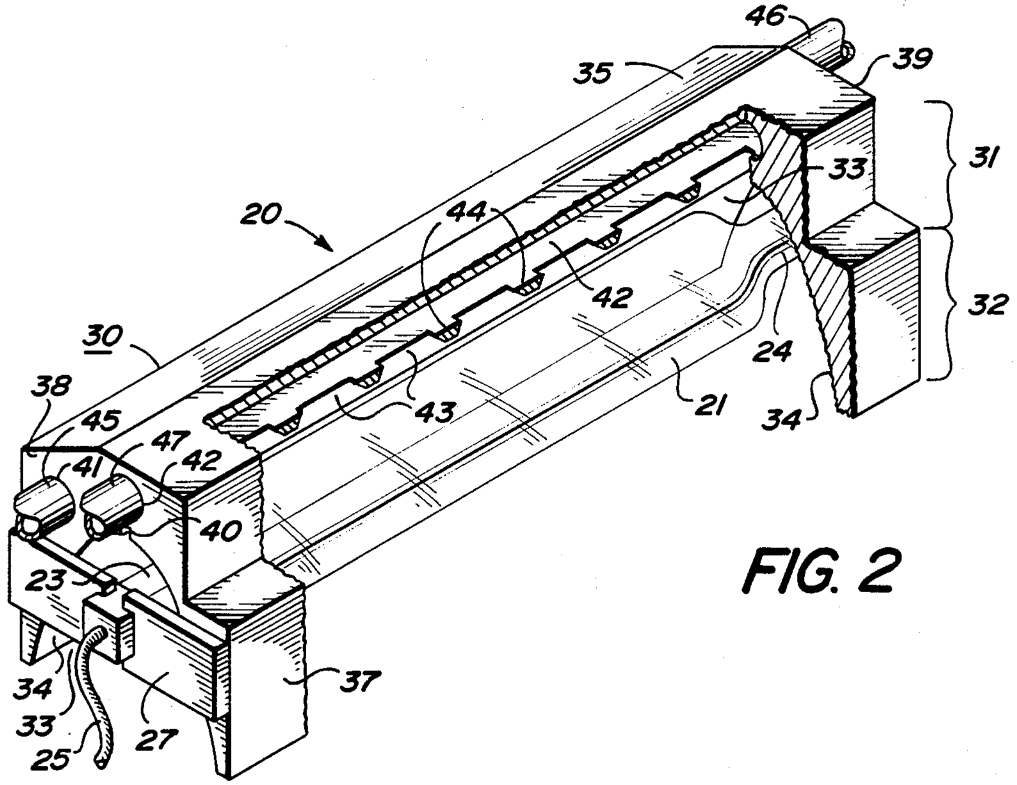
FIG. 2

SYSTEM AND METHOD FOR PHOTOCHEMICALLY CURING A COATING ON A SUBSTRATE

CROSS REFERENCE TO RELATED APPLICATION

This application is a continuation-in-part of U.S. Application Ser. No. 272,763 filed Nov. 17, 1988.

FIELD OF THE INVENTION

This invention relates to an improved system and method for photochemically curing a heat-sensitive coating on a moving substrate. More particularly the system and method are applicable to curing of a heat sensitive coating on a moving substrate so as to minimize problems related to heating and provide apparatus of reduced size for use in presses where only a very limited amount of space is available, at one or more locations, for a curing system.

BACKGROUND OF THE INVENTION

In the printing industry there is a trend toward operating presses at higher and higher speeds and with a variety of different coatings for application on moving substrates. It is recognized that one of the variables for curing such coatings is the application of ultraviolet radiation. Too little ultraviolet radiation, of course, requires a longer curing time, and an excessive amount of heat, which is a byproduct of mercury vapor lamps used for ultraviolet radiation, may create warping and distortion of the coating on the substrate, and contribute, under certain conditions, to fire and equipment problems. The most common device for such heating or curing purposes is a medium pressure mercury vapor ultraviolet lamp which operates at about two atmospheres of pressure and at about 300 watts per inch, although such lamps may operate between 200 to 400 watts per inch. Such lamps typically have an operating temperature of between about 1100° F. to 1500° F. and are used in conjunction with reflectors which direct the ultraviolet light toward the coated substrate that is to be cured. Lamp-reflector assemblies require cooling to operate most effectively and with a minimum of problems, and the cooling must be accomplished under different press operating conditions.

Air, alone or with water, is the usual medium for cooling lamp reflector assemblies. Most commonly air for cooling such assemblies is provided by low pressure, large-volume blowers which operate between about ⅛ to ½ psi. and provide between about 350 to 1500 cfm. The large-volume blowers generate large amounts of air which must be exhausted from the presses and further create large amounts of undesirable ozone which also must be exhausted in a controlled manner from the vicinity of the presses. Occasionally, air for cooling is supplied from a plant compressed air system which has a blower that operates at high pressure and low volume, i.e. about 60 to 80 psi. or higher, and at about 8 to 10 cfm. High pressure air directed through small ports at ultraviolet lamps causes non-uniform cooling of the lamp-reflector assemblies. While both such types of blowers are not restricted in size as they are mounted away from the press equipment, both the low pressure, large volume blower and the high pressure, low volume blower require lamp-reflector assemblies of such a size that they cannot be installed, reasonably, either between the stands of a multi-stand press or in the delivery section thereof, without extensive and expensive modifications to the press equipment.

OBJECTS OF THE INVENTION

It is a main object of the invention to provide a system for curing a coating on a substrate moving through a multi-stand press, which includes curing apparatus that is of a size that can be readily mounted within such a press and can be cooled in a controlled manner by air and water circulated therethrough by equipment mounted external of the press.

Another object is to provide such a system which includes curing apparatus that is of a size that can be readily mounted within such a press and can be cooled in a controlled mannner substantially completely by water circulated therethrough by equipment mounted external of the press.

Another object is to provide a method for operating such a system in a controlled manner such that the system effectively reacts to variations in press conditions and controls the operation of the press lamp-reflector assembly within prescribed temperature ranges.

SUMMARY OF THE INVENTION

An object of the invention is accomplished by a system for curing a coating on a substrate moving through a multi-stand press. The curing is accomplished by means of ultraviolet radiation from a mercury vapor lamp-reflector assembly mounted within the limited confines of the press. The assembly comprises an elongated reflector-block, which has a cavity with a parabolic trough reflective surface, and an ultraviolet lamp mounted within the cavity. The reflector-block includes a longitudinally extending channel at the apex of the cavity, a water conduit and an air conduit. A plurality of ports connect the air conduit with the reflector-block channel. A water pump circulates water to and from the reflector-block water conduit for cooling purposes. First and second intermediate pressure blowers connected in series convey pressurized air to a heat exchanger, which is connected to a refrigerating device, and then sequentially to the reflector-block air conduit, ports and channel from where it is discharged to flow over the ultraviolet lamp and block reflective surface. A temperature measuring device positioned within the reflector-block cavity transmits temperature variations adjacent the ultraviolet lamp to a computer. The computer is connected to the blowers, refrigerating device and heat exchanger and functions to modify the operations thereof in accordance with the temperature transmitted to the computer by the temperature measuring device whereby the system reacts to variations in press conditions and controls the lamp-reflector assembly in a manner to operate within a prescribed temperature range.

In another variation of the invention the objectives are accomplished by a method of operating the system described above in the following manner. The temperature of an ultraviolet lamp for curing the coating on a moving substrate and mounted within the cavity of a reflector-block is controlled within a prescribed temperature range by continuously monitored temperatures adjacent the lamp. Changes in temperature transmitted to a computer control device initiate, in a staged manner, the operation of first and second blowers, a heat exchanger and refrigerating device to reduce the temperature of pressurized air delivered to the reflector-block and discharged therefrom over and around the lamp to maintain its operation within a prescribed temperature range. Water in a controlled manner is also circulated through the reflector-block for cooling purposes and provide a stabilizing reference point for the temperature devices.

In another variation of the invention in which the system is substantially completely cooled by water, the apparatus includes a lamp-reflector assembly, refrigerating device, and reservoir water circulation system and control system for monitoring and regulating the temperature of water circulated through the lamp-reflector assembly. The lamp-reflector assembly includes a reflector block with a generally smooth outer surface, having a cavity with a refective surface, two conduits extending through the reflector block and an elongated ultraviolet lamp positioned fully within the reflector block cavity. The water circulation system includes a pump and associated tubing to circulate water from the refrigerating device reservoir, through the reflector block conduits and back to the refrigerating device. The control system includes a temperature measuring device within the refrigerating device reservoir, a computer and appropriate lines connecting the temperature measuring device, computer and refrigerating device for mounting and controlling within a desired range the temperature of the refrigerated water circulated through the reflector block.

In still another variation of the invention, the objectives are accomplished by a method of operating the system which is substantially completely cooled by water. The control system temperature measuring device monitors the temperature of the water in the refrigerating device reservoir and communicates an applicable signal to the control system computer. When the temperature is not within a desired range, the computer signals the refrigerating device to start or shut-off, as appropriate. In this manner the temperature of refrigerated water circulated to and through the conduits of the reflector block is maintained within a temperature range that permits most efficient operation.

BRIEF DESCRIPTION OF THE DRAWINGS

The nature of the invention will be more clearly understood by reference to the following description, the appended claims and the several views illustrated in the accompanying drawings.

FIG. 1 is a schematic cross-sectional view of the delivery section of the end of a multi-stand, multi-color, sheet-fed printing press through which a coated substrate is passed for the purpose of drying the coating by means of the system and method of this invention.

FIG. 2 is an isometric view of a lamp-reflector assembly of the apparatus of FIG. 1.

DESCRIPTION OF THE PREFERRED EMBODIMENT

Figure 3:
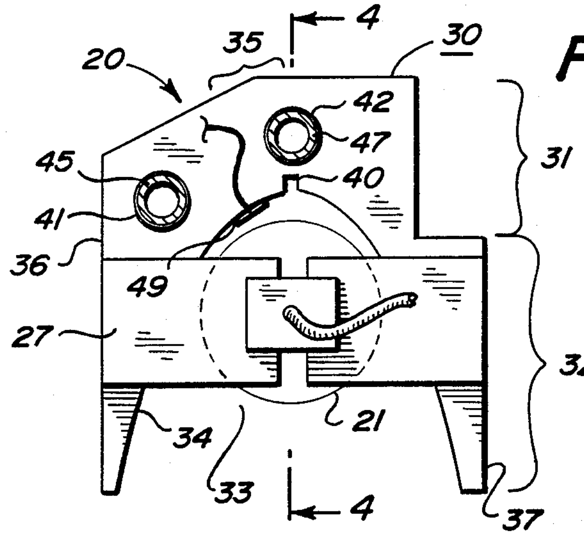
FIG. 3 is an end view of the lamp reflector assembly of FIG. 2.

Referring to FIG. 1 there is shown the delivery section 1 at the end of a multi-stand, multi-color, sheet-fed printing press, not shown, capable of handling coated sheets having a width of approximately 40 inches at a speed of between about 300 to 550 feet per minute. Feed chain 2, shown in greater detail in FIG. 7, moves from the multi-stand section of the press, not shown, in the direction of arrow A along bottom pass line B. Chain 2 continues along the bottom pass line B, upwardly and over guide roller 3 around drive sprocket 4, where it reverses direction. Chain 2 then travels along upper pass line C, over sprocket 5 and downwardly and from delivery section 1 in the direction of arrow D and returns to the multi-stand section of the press.

Spaced along chain 2 are a plurality of releasable clamps 6 that engage the leading edges of sheets 7 which rest on chain 2. On the upper surface 8 of each sheet 7 is a thin coating 9 of ink or chemical that has been placed on surface 8 during the passage of sheets 7 through the multi-stand section of the press. After each sheet 7 passes over guide roller 3, clamps 6 which engage the leading edge of the sheet release, and it drop through delivery section opening 10 onto the top of a stack 11 of sheets 7 from where they can be moved subsequently to a desired location. Exhaust blower 12 continuously removes hot air from the interior of delivery section 1.

As sheets 7 resting on feed chain 2 travel through delivery section 1 along bottom pass lane B, they move beneath one or more ultraviolet lamp-reflector assemblies 20, two as shown in FIG. 1. As best shown in FIGS. 2 through 5, each lamp assembly 20 includes elongated tubular, medium-pressure mercury vapor ultraviolet lamp 21, a line source of light, having a central portion 22 in which there is formed an arc, shown in FIG. 7, that emits radiation, and end portions 23 and 24. Wires 25 and 26 of end portions 23 and 24, respectively, of lamp 21 are connected to a suitable power source, not shown, for energizing lamp 21. Lamp end portions 23 and 24 are mounted in refractory insulators 27 and 28, respectively, secured to opposite ends of elongated reflector-block 30.

As shown in FIG. 2, reflector-block 30, which is made of extruded aluminum, has an upper portion 31 and a lower portion 32 and a cavity 33 in the shape of a parabolic trough having a reflective surface 34. As shown in FIGS. 2–5, reflector-block 30 has a top 35, side 36, stepped side 37 and ends 38 and 39. At the apex of reflective surface 34 is channel 40 that extends longitudinally of block 30 from end 38 to end 39. Extending longitudinally of block 30, from end 38 to end 39, are water conduit 41 and air conduit 42. Water conduit 41 is positioned in the upper portion 31 of block 30, between reflective surface 34 and block top 35 and side 36. Air conduit 42 is positioned in the upper portion 31 of block 30, between channel 40 and top 35. A plurality of longitudinally extending ports 43, separated by narrow ribs 44, connect channel 40 with conduit 42.

Figure 4:
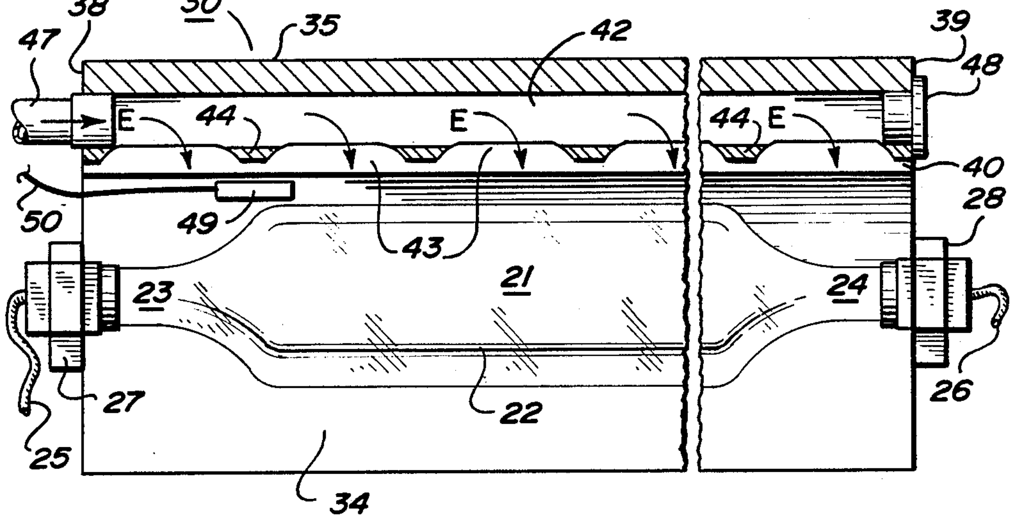
FIG. 4 is a cross-section taken through the line 4—4 of FIG. 3 looking in the direction of the arrows 4—4.
Figure 5:
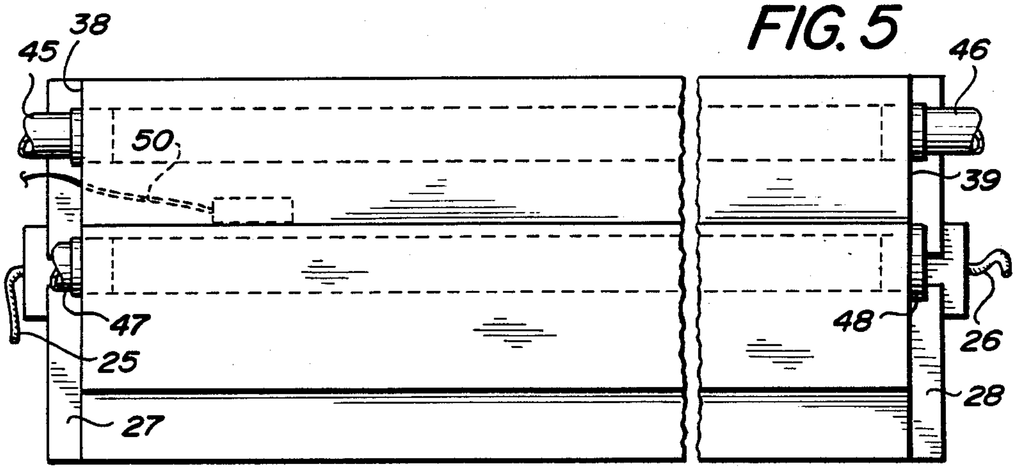
FIG. 5 is a plan view of the lamp reflector assembly of FIG. 2.

As shown in FIGS. 2, 4 and 5, connected to water conduit 41 at reflector-block end 38 is water inlet tubing 45, and at reflector-block end 39 is water discharge tubing 46. Connected to air conduit 42 at reflector-block end 38 is air inlet tubing 47. Air conduit 42 is closed by plug 48 at reflector-block end 39. As shown in FIGS. 3–5, secured to block reflective surface 34, a distance of about 1 inch from channel 40 and spaced about 4 inches from block end 38 is temperature sensing device 49, such as a thermocouple or thermistor, from which wires 50 extend.

Figure 6:
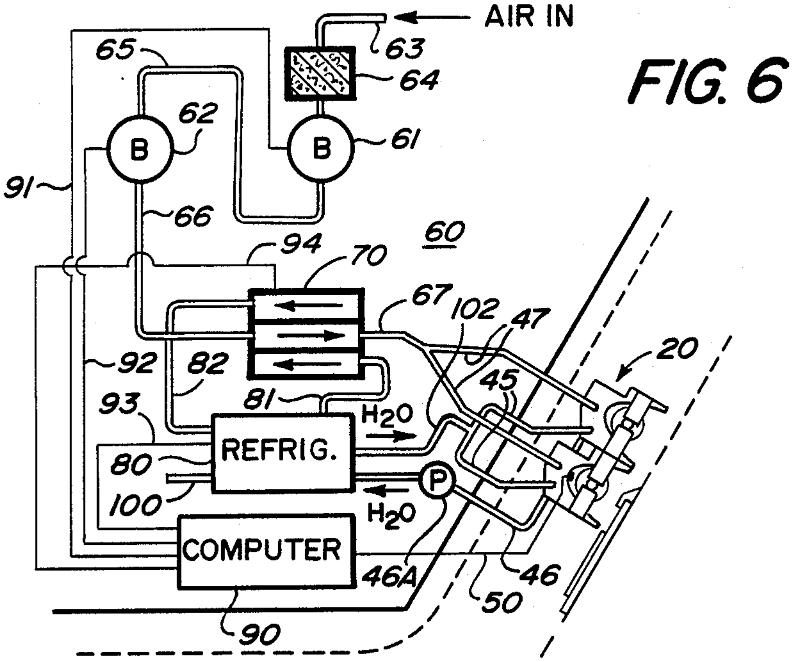
FIG. 6 is an enlarged fragmentary view of FIG. 1 showing the system of the invention in greater detail, including the air, water, refrigerating and computer control apparatus.

As best shown in FIG. 6, cool, i.e. refrigerated, air and water is supplied to lamp-reflector assemblies 20 by means of air-water system 60. System 60 includes intermediate pressure blowers 61 and 62, which are connected in series, heat exchanger 70, refrigerating device 80 and computer control device 90. Air is supplied to blower 61 through air inlet tubing 63 and air filter 64. In blower 61 the air is pressurized and its temperature elevated somewhat before being discharged through connecting tube 65 to blower 62 where the air is further pressurized and its temperature again elevated. The pressurized, heated air then passes through tube 66 to and through a first side of shell and tube heat exchanger 70 where the pressurized air is cooled as hereinafter described. As shown in FIG. 6, the cooled pressurized air then passes through cooled air discharge line 67 to air inlet tubing 47 and to air conduit 42 of each lamp assembly 20. The cooled, pressurized air passes into air conduit 42 and discharges through ports 43 and reflector-block channel 40, at between about ¼ to ½ cfm. per linear inch of length, as shown in FIG. 4 by arrows E, over and around lamp 21 to uniformly cool it and maintain its temperature within a prescribed operating range, i.e. between about 1100° F. to 1500° F.

As shown in FIG. 6, the pressurized heated air passing through one side of heat exchanger 70 has its temperature lowered by coolant that circulates from refrigerating device 80 through coolant tube 81 to a second side of heat exchanger 70 where the coolant extracts heat from the pressurized air in the first side thereof. The coolant at a higher temperature exits heat exchanger 70 and returns through coolant tube 82 to refrigerating device 80 where the temperature of the coolant is lowered in a manner well known to those skilled in the art.

As shown in FIGS. 2, 5 and 6, each reflector-block 30 is also cooled by water circulated in a closed loop through refrigerating device 80, water feed tube 102 and water inlet tubing 45, water conduit 41 and water discharge tubing 46 of each such block back to refrigerating device 80. Circulation is accomplished by water pump 46A connected to discharge tube 46. Water is initially provided to the closed loop through water supply tube 100, from a source not shown, which connects to refrigerating device 80 and water feed tube 102 therein but not shown. Any replenishment of water is provided in the same manner. The cooled water passing through water conduit 41 of each reflector block 30 acts to maintain its temperature within a prescribed operating range of between about 50° F. to 80° F., preferably about 65° F. In passing through reflectorblock 30, the water temperature rises and it returns through water discharge tubing 46 and pump 46A to refrigerating device 80 where the water is recooled.

In another variation of the invention the objectives are accomplished by a method of operating the above described system in the following manner.

At the time of starting a multi-stand press ahead of delivery section 1, pump 46A operates to circulate water through reflector-block 30 to bring it within a reference temperature of between about 45° F. to 75° F., preferably about 50° F. Temperature sensing device 49, connected by line 50 to computer control device 90, continually monitors the temperature within the vicinity of its position adjacent block reflective surface 34 and lamp 21, and when that temperature exceeds 75° F. computer control device 90 through line 93 starts refrigerating device 80 to cool the water circulating through device 80.

When desired the press operator strikes lamp 21, i.e. turns on the power, initiating an arc within its central portion 22, and lamp 21 reaches full power in about 2 minutes. As the lamp continues operation and grows hotter the temperature in the vicinity thereof and adjacent reflector-block 40 rises and the continually rising temperatures are communicated by temperature sensing device 49 to computer control device 90. When the temperature reaches between 140° F. to 160° F., computer control device 90 through line 91 starts intermediate pressure blower 61 which draws air through air inlet tube 63 and filter 64 and compresses it to a pressure of between about ½ psi. to 1 psi. and increases the temperature thereof. For example, if the air to blower 61 has an ambient temperature of about 70° F., the temperature of the pressurized air increases to about 90° F. Pressurized air from blower 61 circulates through the appropriate tubing through intermediate pressure blower 62, which is inactive, heat exchanger 70, which is also inactive, to reflector-block 30 where the air passes into air conduit 42 and is discharged through ports 43 and channel 40 over lamp 21 and reflective surface 34 of such block.

Even as the pressurized air from blower 61 is discharged over lamp 21, its operating temperature continues to increase, as do the temperatures monitored by sensing device 49. When the temperature communicated to computer control device 90 by sensing device 49 rises to between about 450° F. to 550° F., control device 90 through line 92 starts intermediate pressure blower 62 connected in series with blower 61. Blower 62 through tube 65 receives pressurized heated air from blower 61 and further compresses it to a pressure between about 1.5 psi. to 1.75 psi., further increasing its temperature. The further pressurized and hotter air circulates through heat exchanger 70, which remains inactive, and to reflector-block 30 in the manner described in the preceding paragraph. The air discharged from blower 62 has a temperature of between about 90° F. to 130° F., preferably about 110° F.

When the temperature communicated by temperature sensing device 49 to computer control device 90 rises to between about 650° F. to 750° F., control device 90, through line 93 starts refrigerating device 80 which circulates coolant through line 81, heat exchanger 70 and coolant return tube 82 back to device 80. The heated and pressurized air passing through a first side of heat exchanger 70 is cooled by the passage of coolant from refrigerating device 81 circulated through the second side of heat exchanger 70 in a manner to decrease the temperature of the pressurized air between about 30° F. to 50° F. The heated, pressurized air passing through heat exchanger 70 is cooled to a temperature between about 50° F. to 80° F., preferably about 60° F. and passes to and from reflector-block 30 through channel 40 and over the surface of lamp 21 and block reflective surface 34 to cool those elements.

The preferred embodiment of the system described above and its method of operation is used in conjunction with a press that is programmed to operate at four different stages of power, i.e. ¼, ½, ¾ or full power and computer control device 90, responding to temperatures communicated to it from temperature sensing device 49, functions to activate blower 61, blower 62, refrigerating device 80 and heat exchanger 70 in the manner described above. Other dryer systems incorporated in commercial presses do not operate in the 4-stage manner described above and operate only at ½ or full power. At startup of such other presses the cooling air blower is started at approximately the same time that the lamp arc is struck, and the air, at times, tends to over-cool the lamp and cause the arc to extinguish. Because of such early cooling present commercially available ultraviolet systems require between about 3 to 5 minutes for the ultraviolet lamp to reach full power.

In the delivery sections of commercial sheet-fed presses space is limited and the distance small between the bottom and upper pass lines of the chain normally used for transporting the printed sheets through the presses. Consequently, in presses currently in service, any equipment to be retrofitted into such sections must be small and function well enough to do its job. If large equipment is used, the pass lines of the chain must be spread, which involves a major and costly modification of the delivery section. In addition, the commercial pressure to operate presses at higher speeds sometimes can be satisfied only by placing additional drying equipment between the stands of a multi-stand press, locations where space is also at a premium.

Figure 7:
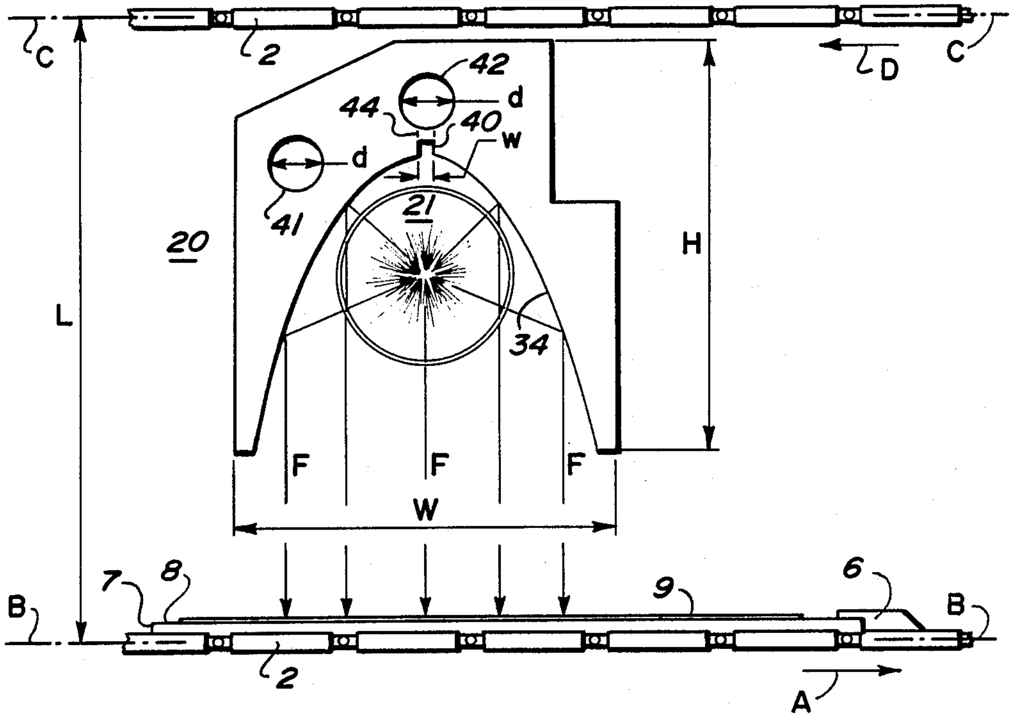
FIG. 7 is an enlarged schematic view, similar to FIG. 3, showing the limited space in which the lamp-reflector assembly of the system of the invention can be installed and the manner in which ultraviolet rays are reflected by the lamp-reflector assembly of the system of this invention.

In FIG. 7 is illustrated a manner in which the lamp reflector assembly 20 of the preferred system described above may be installed between the bottom pass line B and the upper pass line C of chain 2. In many presses the distance L between such pass lines may be only between about 3 inches to 6 inches. By virtue of the air and water cooling of the lamp-reflector assembly 20 it can be manufactured with an overall height H of between about 2¾ inches to 3¼ inches, with a width W of between about 2 inches to 3½ inches. In a lamp-reflector assembly 20 with such dimensions, channel 40 may have a width w between about 3/64 inch to 9/64 inch, preferably about 1/16 inch, and water conduit 41 and air conduit 42 each may have a diameter d between about ⅜ inch to ¾ inch. The diameter of lamp 21 may be between about ¾inch to 1 3/16 inches. The length of lamp 21 governs the length of reflector-block 30, channel 40 and ports 43. It is important that channel 40 have a length at least equal to the central portion 22 of lamp 21 to ensure adequate cooling of the central portion. Preferably elongated channel 40 should be at least as long as the overall length of lamp 21, i.e. including lamp end 23, central portion 22 and end 24 to ensure that the ends of the lamp receive adequate cooling. One of the advantages of the elongated channel 40 is that the pressurized air passing therefrom flows over and around lamp 21 to cool the surface thereof in a uniform manner. The arrows F in FIG. 7 illustrate the manner in which rays reflect in a parallel manner from parabolic trough reflective surface 34.

Blowers 61 and 62 have been identified as intermediate pressure blowers. An intermediate pressure blower is one that operates at a pressure of about ½ to 4 psi. with an output of between about 50 to 420 cfm. One blower meeting such requirements is a regenerative blower made by Gast Manufacturing Corp. of Benton Harbor, Mich. This blower has blades only at the periphery of the impeller and as the blower impeller rotates, centrifugal force moves air from the root of the blade to the blade tip. Upon leaving the blade tip the air flows around the impeller housing contour back to the root of the succeeding blade where the flow pattern is repeated. This action provides a quasi-staging effect to increase pressure differential capability. In the preferred embodiment described above computer control device 90 is an open board computer manufactured by Analog Device, Inc. of Norwood, Mass. Refrigerating device 80 includes a condensing unit manufactured by Copeland Corporation of Sidney, Ohio. Heat exchanger 70 is a shell and tube heat exchanger manufactured by Trantor Division of ITT Corporation.

Reflector-block 30 is made of extruded aluminum, which provides adequate strength to support an ultraviolet lamp, has a length of up to 60 inches and operates at a temperature of about 1100° F., without sagging and damaging the lamp. While the preferred embodiment of reflector-block 30 includes a plurality of ports 43 separated by ribs 44, there can be one single port having a length approximately equal to that of channel 40. Ribs 44 strengthen and provide rigidity for reflector block 30 and prevent it from sagging and deteriorating under the high oerating conditions of lamp 21.

In certain presses operating under particularly difficult conditions, it is desirable to have a curing system that is substantially completely cooled by refrigerated water. It is also desirable to have a system in which the radiation striking the coated substrate is substantially the same as the radiation from the originating source, i.e. from the lamp and reflective surface of the reflector-block assembly. Such a system shall be referred to as one having a "uniform refractive index". Putting it another way, it is desirable to have a substantially completely water cooled system which avoids the use of one or more filters between the reflector-block assembly and the coated substrate. Such filters tend to build-up heat in a system and/or create an uneven dispersion of radiation at the substrate, which tends to have a higher heat gradient at discrete points. Both such conditions contribute to curing and/or operating problems. The embodiment of such a substantially completely water cooled system is shown in FIG. 8 wherein there are shown two ultraviolet lamp reflector assemblies 220 positioned in the delivery section, not shown, at the end of a multi-stand, multi-color, sheet-fed printing press, not shown, as described above; refrigerating device 280 and reservoir 281; closed water circulation system 260 and control system 300.

Figure 10:
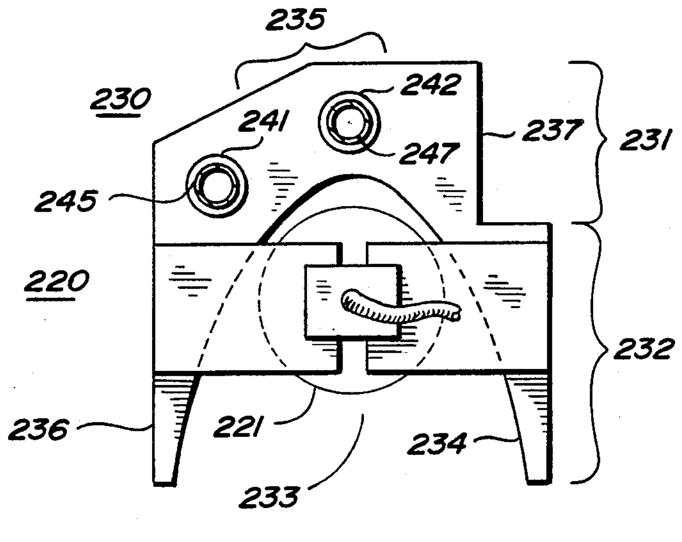
FIG. 10 is an end view of the lamp reflector assembly of FIG. 9.
Figure 9:
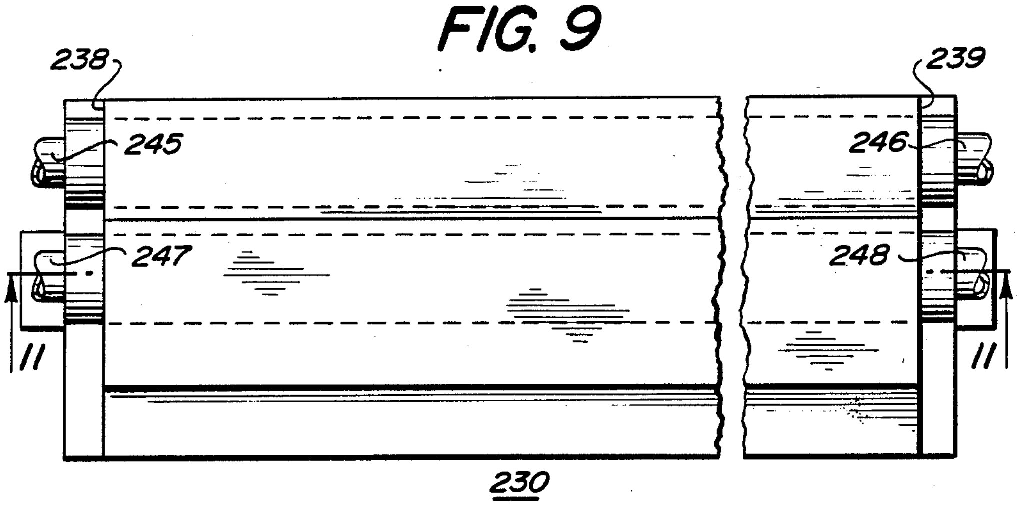
FIG. 9 is a plan view of the lamp relflctor assembly of the embodiment of the apparatus shown in FIG. 8.
Figure 11:
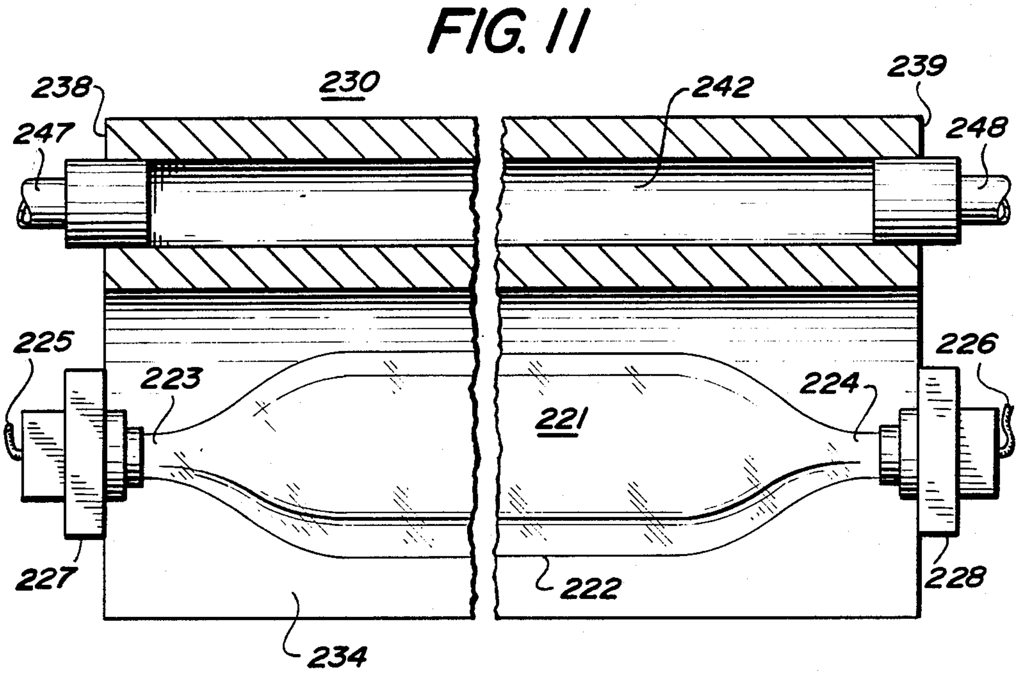
FIG. 11 is a cross-section taken through the line 11—11 of FIG. 9, looking in the direction of the arrows 11—11.

As best shown in FIGS. 9, 10, and 11, each lamp assembly 220 includes elongated tubular, medium-pressure mercury vapor ultraviolet lamp 221, a line source of light, having a central portion 222 and end portions 223 and 224. Lines 225 and 226 of end portions 223 and 224, respectively, of lamp 221 are connected to a suitable power source, not shown, for energizing lamp 221. Lamp end portions 223 and 224 are mounted in refractory insulators 227 and 228, respectively, secured in opposite ends of elongated reflector block 230. Reflector block 230, which is a monolithic extruded aluminum member, has an upper portion 231, a lower portion 232 and a cavity 233, which is in the shape of a parabolic trough that has a smooth reflective surface 234. Block 230 has a top 235, side 236, stepped side 237 and ends 238 and 239. Extending longitudinally of block 230 from end 238 to end 239 are spaced water conduits 241 and 242. Water conduits 241 and 242 are positioned in the upper portion 231 of block 230, between cavity reflective surface 234 and block top 235 and between side 236 and stepped side 237. Lamp 221 is mounted fully within cavity 233 for proper focusing of the light rays, for shielding the coated sheet and surrounding environment from stray light and heat and to protect the lamp from being struck and damaged accidentally.

Figure 8:
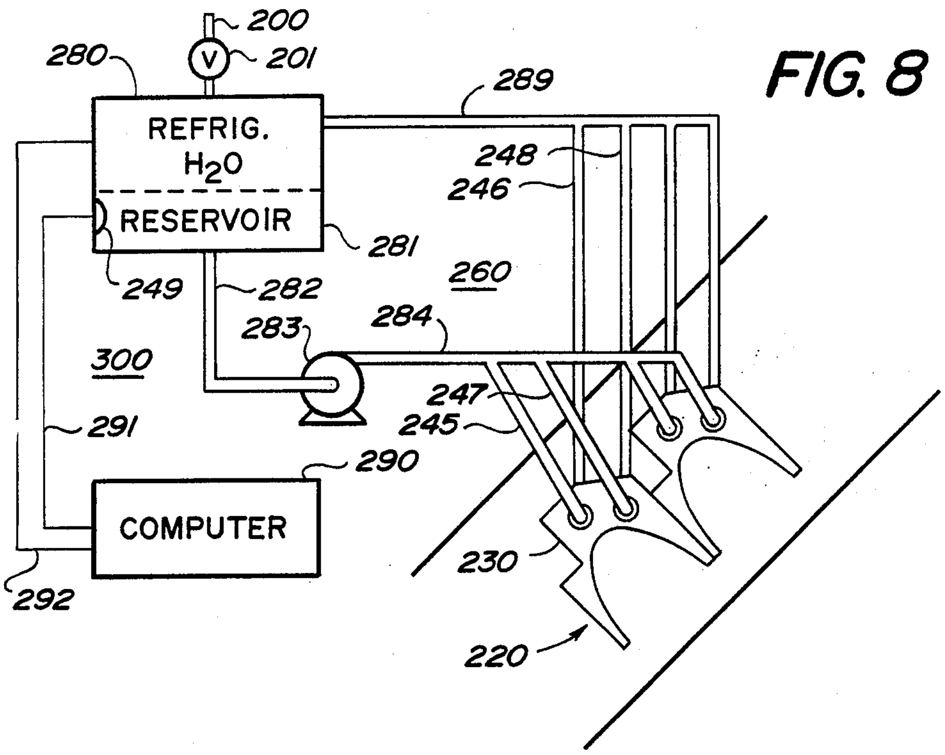
FIG. 8 is a schematic view of a portion of the delivery section of the end of a multi-stand, multi-color, sheet-fed printing press through which a coated substrate is passed for the purpose of drying the coating by means of another embodiment of the system and method of this invention.

As shown in FIGS. 8, 9 and 11, connected to water conduits 241 and 242 at reflector-block end 238 are water inlet tubes 245 and 247, respectively, and at reflector-block end 239 are water discharge tubes 246 and 248, respectively.

FIG. 8, shows a closed system for supplying refrigerated water to lamp reflector assembly 220. Water is circulated through water circulation system 260 in a closed loop through refrigerating device 280, connecting water reservoir 281, pump water supply tube 282, pump 283, pump water discharge tube 284, water inlet tubes 245 and 247 to and through conduits 241 and 242, respectively, of reflector block 230. From reflector block end 239, water from conduits 241 and 242 passes through water discharge tubes 246 and 248, respectively, and refrigerating device water inlet tube 289 to refrigerating device 280. Water, as required, is fed from a source, not shown, to refrigerating device 280 through feed line 200 equipped with a shut-off valve 201.

A curing system which includes the embodiment of the invention using a reflector block substantially completely cooled by refrigerated water may be controlled in a manner similar to that described above for an air-water system, i.e. with a computer control system including a temperature sensing device mounted within reflector block cavity 233. However, as shown in FIG. 8, a preferred control system 300 includes within water reservoir 281 a temperature measuring device 249 which is connected by line 291 to computer 290 that is connected to refrigerating device 280 by line 292. Temperature measuring device 249 monitors the temperature of the water within reservoir 281 and communicates an applicable signal through line 291 to computer 290. When the temperature of the water within reservoir 281 is not within a preferred range of 45° F. to 75° F., the computer 290, through line 292, signals refrigerating device 280 to start or shut off as conditions require. Computer 290 may be programmed to start refrigerating device 280 to lower the temperature of, or recool, the water when the temperature of the water within reservoir 281 is about 60° F. so that the temperature of the water within water circulation system 260, preferably, does not exceed about 75° F., at any time. When the refrigerated cooling water fed to reflector block 230 is within the preferred temperature range of 45° F. to 75° F., reflector block 230 operates within a range between of 50° F. to 90° F., depending upon various environmental factors, a very desirable operating temperature.

The refrigerated water passing through water inlet conduits 241 and 242 to reflector block 230 acts to maintain its temperature within a prescribed operating range of between about 40° F. to 90° F. preferably about 65° F. The pressure of the water fed to conduits 241 and 242 at block end 238 is about 20 to 30 psi, and the flow of water through such conduits is maintained at between about 0.75 to 1.25 gallons per minute for a reflector block about 40 inches long and 0.75 to 2.25 gallons per minute for a reflector block about 70 inches long. Preferably pump 283 is a turbine-type pump having a discharge pressure of about 90 psi or a positive displacement pump with similar characteristics.

The unique feature of the reflector blocks of the embodiments of the systems of this invention, i.e. reflector blocks 30 and 230, is that all surfaces are generally smooth, i.e. generally flat, as are the flat outer surfaces, or curved, as are the block cavities. As used herein "generally smooth" means without surface enhancements, such as ribs or fins, which meaningfully increase surface area in such a way to convect heat to the surrounding environment. Use of fins or ribs on reflector blocks is the usual way of improving the cooling of such blocks by increasing surface area in much the same manner as do fins on the coil or tube of a conventional room hot water system. However, cooling reflector blocks by means of fins or ribs causes heat to dissipates to the surrounding environment which, in the case of printing press curing equipment, may create serious operating problems. By using a reflector block with generally smooth surfaces and using only refrigerated water from a closed loop system for cooling purposes, heat from the ultraviolet lamp is concentrated in the reflector block. The block acts as a heat sink and the cooling water absorbs the heat and carries it away from both the reflector block and surrounding equipment in a manner to contribute to improved operation. The substantially completely water cooled reflector block is of a size comparable to that of the air-water cooled block of the preferred embodiment.

Water conduits 241 and 242 of water reflector block 230 have a diameter between about $\frac{3}{8}$ inch to $\frac{3}{4}$ inch. For a variety of reasons, conduits 241 and 242 are circular in cross-section, but they can be any other shape which provides an adequate cross-sectional area for cooling purposes. In similar fashion, one large water conduit or cavity of any adequate cross section may be used instead of the two circular conduits shown and described. However, one large conduit will require larger and, possibly, additional fittings which may be difficult to fit and assemble in confined spaces.

The term "refrigerated water" or liquid as used herein means water that is artificially cooled to a temperature of between about 45° F. to 75° F. regardless of ambient temperature. Such cooling can be artifically accomplished in a closed loop system including a heat exchanger wherein liquid is cooled by a refrigerating device, liquid nitrogen, ice, etc.

The term "substantially completely cooled by water" as used herein means that the reflector block of the system is cooled to a temperature of between about 50° F. to 90° F. by the sole use of refrigerated water circulated through one or more conduits of the block. No other air cooling is required and, if used, may require the use of additional equipment and/or possibly contribute to operating problems.

Pumps 46A and 283 used in the above described embodiments of this invention are turbine-type pumps having a discharge pressure of about 90 psi, or positive displacement pumps with similar characteristics. Such pumps will convey water at a pressure of about 20 to 30 psi to water conduits in a reflector block at a flow rate of between about 0.75 to 2.25 gallons per minute.

By use of the above embodiment of the invention having a reflector block which is substantially completely cured by refrigerated water within a preferred temperature range of between about 45° F. to 75° F., the wattage per inch for lamp 221 can be increased significantly. Increasing the lamp wattage produces a commensurate increase in curing speed for the coating on a moving substrate. For example, in prior art cooling systems the lamps are 200 to 300 watts per inch which produces a curing speed of approximately 200 feet per minute for a substrate coated with a clear ultraviolet varnish about ½ mill thick, as an example one of many ultraviolet varnishes made by Pierce and Stevens Co. By comparison in a system using a reflector block which is substantially completely cured by refrigerated water and without air cooling and/or use of a filter, a more power intensive lamp of about 400 to 450 watts per inch can be used for curing an identical ultraviolet varnish about ½ mill thick on a substrate moving at a speed as high as about 300 to 350 feet per minute, more than a 50% improvement in speed. Under normal circumstances the power to cure speed ratio may be increased by from about 15% to 40% a substantial improvement in operating efficiency, with commensurate reduction in operating costs.

While the system of this invention and its method of operation have been described above in a preferred manner and second embodiment, the description has been simplified by avoiding reference to detailed piping, valving and controls that are inherent in any such system and well known to those skilled in the art. It is also recognized that reflective surfaces 34 and 234 which have been described as parabolic trough reflective surfaces, can be made in a variety of shapes. While reference has been made to cooling by water, any acceptable liquid coolant may be used. It is further recognized that modifications and variations can be made by those skilled in the art to the above described systems and methods without departing from the spirt and scope thereof as defined in the appended claims.

I claim:

1. Apparatus for curing a coating on a moving substrate by ultraviolet radiation comprising:
   (A) a lamp-reflector assembly comprising:
      (a) an elongated reflector block having:
         (i) a cavity having a reflective surface, and
         (ii) a conduit extending through said block,
      (b) an elongated ultraviolet lamp having a central portion within said reflector block cavity;
   (B) refrigerating means for cooling a liquid;
   (C) a closed loop system for circulating said cool liquid between said reflector block conduit and said refrigerating means comprising:
      (a) pump means, and
      (b) tubing means;
   (D) a control system comprising:
      (a) temperature monitoring means for monitoring the temperature of said cooling liquid circulated through said closed loop system, and
      (b) control means connected with said temperature monitoring means and said refrigerating means for receiving signals from said temperature monitoring means and signaling said refrigerating means when the signals from said temperature monitoring means indicate that the cooled liquid circulating through said closed loop system has deviated from an established temperature range.

2. The apparatus of claim 1 wherein said apparatus further includes:
   (A) reservoir means connected with said refrigerating means for holding said cooled liquid; and
   (B) said temperature monitoring means is connected with said reservoir means for monitoring cooled liquid therein.

3. The apparatus of claim 1 wherein said reflector-block is a monolithic aluminum extrusion having:
   (A) a generally smooth outer surface,
   (B) a cavity with a parobolic trough reflective surface, and
   (C) two conduits extending longitudinally thereof.

4. Apparatus for curing a coating on a substrate by ultraviolet radiation comprising:
   (A) a lamp-reflector assembly comprising:
      (a) a monolithic aluminum extrusion elongated reflector block having:
         (i) a generally smooth outer surface,
         (ii) a cavity with a parobolic trough reflective surface, and
         (iii) at least one conduit extending longitudinally thereof;
      (b) an elongated ultraviolet lamp having a central portion within said reflector block cavity;
   (B) refrigerating means for cooling a liquid;
   (C) reservoir means connected to said refrigerating means for holding said cooled liquid;
   (D) a closed looped system for circulating said cooled liquid between said reflector block conduit, said refrigerating means and said reservoir means comprising:
      (i) pump means, and
      (ii) tubing means;
   (E) a control system comprising:
      (a) temperature monitoring means for monitoring the temperature of said cooling liquid circulated through said closed loop system; and
      (b) control means connected with said temperature monitoring means and said refrigerating means for receiving signals from said temperature monitoring means and signaling said refrigerating means when the signals from said temperature monitoring means indicate that the cooled liquid circulating through said closed loop system has deviated from an established temperature range.

5. Apparatus for curing a coating on a moving substrate by ultraviolet radiation of a substantially uniform refractive index comprising:
   (A) a lamp-reflector assembly comprising:
      (a) an elongated reflector block having:
         (i) a cavity having a reflective surface, and
         (ii) a conduit extending through said block,
      (b) an elongated ultraviolet lamp having a central portion within said reflector block cavity;
   (B) refrigerating means for cooling a liquid;
   (C) a closed loop system for circulating said cooled liquid between said reflector block conduit and said refrigerating means comprising:
      (a) pump means, and
      (b) tubing means;
   (D) a control system comprising:

(a) temperature monitoring means for monitoring the temperature of said cooling liquid circulated through said closed loop system, and (b) control means connected with said temperature monitoring means and said refrigerating means for receiving signals from said temperature monitoring means and signaling said refrigerating means when the signals from said temperature monitoring means indicate that the cooled liquid circulating through said closed loop system has deviated from an established temperature range.

6. The apparatus of claim 5 wherein said apparatus further includes:

(A) reservoir means connected with said refrigerating means for holding said cooled liquid; and (B) said temperature monitoring means is connected with said reservoir means for monitoring cooled liquid therein.

7. The apparatus of claim 5 wherein said reflector-block is a monolithic aluminum extrusion having:

(A) a generally smooth outer surface, (B) a cavity with a parobolic trough reflective surface, and (C) two conduits extending longitudinally thereof.

8. Apparatus for curing a coating on a substrate by ultraviolet radiation of a substantially uniform refractive index (A) a lamp-reflector assembly comprising:

(a) a monolithic aluminum extrusion elongated reflector block having:

(i) a generally smooth outer surface, (ii) a cavity with a parobolic trough reflective surface, and (iii) at least one conduit extending longitudinally thereof;

(b) an elongated ultraviolet lamp having a central portion within said reflector block cavity;

(B) refrigerating means for cooling a liquid;

(C) reservoir means connected to said refrigerating means for holding said cooled liquid;

(D) a closed looped system for circulating said cooled liquid between said reflector block conduit, said refrigerating means and said reservoir means comprising:

(a) pump means, and (b) tubing means;

(E) a control system comprising:

(a) temperature monitoring means for monitoring the temperature of said cooling liquid circulated through said closed loop system; and (b) control means connected with said temperature monitoring means and said refrigerating means for receiving signals from said temperature monitoring means and signaling said refrigerating means when the signals from said temperature monitoring means indicate that the cooled liquid circulating through said closed loop system has deviated from an established temperature range.

9. An improved method for curing a coating on a substrate by means of an elongated ultraviolet lamp having a central portion mounted within the cavity of a reflector block having a conduit extending therethrough, comprising:

(A) cooling liquid by refrigerating means;

(B) circulating said cooled liquid through said conduit of said reflector block by means of a closed loop circulation system comprising:

(a) said refrigerating means, (b) pump means, and (c) tubing means;

(C) controlling the temperature of the cooled circulating liquid within a range of between about 45° F. to 75° F. by monitoring the temperature of the liquid and starting said refrigerating means to recool the liquid when the temperature thereof exceeds an established parameter within said range of between about 45° F. to 75° F., by means of a control system comprising:

(a) means for monitoring the temperature of the cooled circulating liquid, and (b) control means connected with said temperature means and said refrigerating means.

10. The improved method of claim 9 wherein said cooled liquid is circulated through said coolant conduit at a flow rate of between about 0.75 to 2.25 gallons per minute.

11. The improved method of claim 9 wherein the cooled liquid circulated through the conduit of said reflector-block substantially completely cools said block within a temperature range of between about 50° F. to 90° F.

12. An improved method for curing a coating on a substrate by ultraviolet radiation by means of an elongated ultraviolet lamp having a central portion mounted totally within the cavity of a reflector-block having two conduits extending therethrough, comprising:

(A) cooling liquid by refrigerating means;

(B) circulating said cooled liquid at a flow rate of between about 0.75 to 2.25 gallons per minute to said reflector-block conduits to substantially completely cool said block within a temperature of between about 50° F. to 90° F. by means of a closed loop circulation system comprising;

(a) said refrigerating means, (b) pump mans, and (c) tubing means;

(C) controling the temperature of said cooled circulating system within a range between about 45° F. to 75° F. by monitoring the temperature of the liquid and starting said refrigerating means to recool the liquid when the temperature thereof exceeds an established parameter within said range of about 45° F. to 75° F. by means of a control system comprising;

(a) means for monitoring the temperature of the circulating liquid, and (b) control means connected with said temperature monitoring means and said refrigerating means.

13. An improved method for curing a coating on a substrate by ultraviolet radiation of a substantially uniform refractive index by means of an elongated ultraviolet lamp having a central portion mounted within the cavity of a monolithic extruded aluminum reflector block having a conduit extending therethrough, comprising:

(A) cooling a liquid by refrigerating means;

(B) circulating said cooled liquid through said conduit of said reflector block by means of a closed loop circulation system comprising:

(a) said refrigerating means, (b) pump means, and (c) tubing means;

(C) controlling the temperature of the cooled circulating liquid within a range of between about 45° F. to 75° F. by monitoring the temperature of the liquid and starting said refrigerating means to recool the liquid when the temperature thereof exceeds an established parameter within said range of between about 45° F. to 75° F. by means of a control system comprising:

(a) means for monitoring the temperature of the cooled circulating liquid, and (b) control means connected with said temperature means and said refrigerating means.

14. The improved method of claim 13 wherein said cooled liquid is circulated through said coolant conduit at a flow rate of between about 0.75 to 2.25 gallons per minute.

15. The improved method of claim 13 wherein the cooled liquid circulated through the conduit of said reflector-block substantially completely cools said block within a temperature range of between about 50° F. to 90° F.

16. An improved method for curing a coating on a substrate by ultraviolet radiation of a substantially uniform refractive index by means of an elongated ultraviolet lamp having a central portion mounted totally within the cavity of a reflector-block having two conduits extending therethrough, comprising:

(A) cooling a liquid by refrigerating means, (B) circulating said cooled liquid at a flow rate of between about 0.75 to 2.25 gallons per minute through said reflector-block conduits to substantially completely cool said block within a temperature range of between about 50° F. to 90° F. by means of a closed loop circulation system comprising;

(a) said refrigerating means, (b) pump means, and (c) tubing means;

(C) controlling the temperature of said cooled circulating system within a range between about 45° F. to 75° F. by monitoring the temperature of the liquid and starting said refrigerating means to re-cool the liquid when the temperature thereof exceeds an estimated parameter within said range of about 45° F. to 75° F. by means of a control system conprising;

(a) means for monitoring the temperature of the circulating liquid, and (b) control means connected with said temperature monitoring means and said refrigerating means.

* * * * *

UNITED STATES PATENT AND TRADEMARK OFFICE

CERTIFICATE OF CORRECTION

PATENT NO. : 4,983,852

DATED : Jan. 8, 1991

INVENTOR(S) : Joseph T. Burgio, Jr.

It is certified that error appears in the above-identified patent and that said Letters Patent is hereby corrected as shown below:

Col. 9, line 66, "between of" should read --between about--

Col. 10, line 44. "$40^{o}$ F." should read --$50^{o}$F.--.

Col. 13, line 27, "index" should read --index comprising--.

Signed and Sealed this

Twenty-third Day of June, 1992

*Attest:*

DOUGLAS B. COMER

*Attesting Officer*

*Acting Commissioner of Patents and Trademarks*